(12) United States Patent
Kasada

(10) Patent No.: US 11,423,934 B2
(45) Date of Patent: *Aug. 23, 2022

(54) MAGNETIC TAPE, MAGNETIC TAPE CARTRIDGE, AND MAGNETIC RECORDING AND REPRODUCING APPARATUS

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,158

(22) Filed: Mar. 26, 2020

(65) Prior Publication Data
US 2020/0312361 A1 Oct. 1, 2020

(30) Foreign Application Priority Data
Mar. 28, 2019 (JP) .............................. JP2019-064370

(51) Int. Cl.
| | | |
|---|---|---|
| *G11B 5/733* | (2006.01) | |
| *G11B 5/735* | (2006.01) | |
| *G11B 5/78* | (2006.01) | |
| *G11B 5/706* | (2006.01) | |
| *G11B 5/008* | (2006.01) | |
| *G11B 5/712* | (2006.01) | |
| *G11B 5/714* | (2006.01) | |

(52) U.S. Cl.
CPC ...... *G11B 5/70678* (2013.01); *G11B 5/00817* (2013.01); *G11B 5/712* (2013.01); *G11B 5/714* (2013.01); *G11B 5/7358* (2019.05)

(58) Field of Classification Search
CPC . G11B 5/00817; G11B 5/70678; G11B 5/712; G11B 5/714; G11B 5/7358; G11B 5/70642; G11B 5/7356
See application file for complete search history.

(56) References Cited

U.S. PATENT DOCUMENTS

| | | | |
|---|---|---|---|
| 4,693,929 | A | 9/1987 | Ryoke et al. |
| 5,671,211 | A | 9/1997 | Akashi et al. |
| 7,011,899 | B2 | 3/2006 | Kato |
| 7,755,863 | B2 | 7/2010 | Neumann et al. |
| 8,535,817 | B2 | 9/2013 | Imaoka |

(Continued)

FOREIGN PATENT DOCUMENTS

| | | |
|---|---|---|
| JP | 2002-269711 A | 9/2002 |
| JP | 2003-22520 A | 1/2003 |

(Continued)

OTHER PUBLICATIONS

U.S. Appl. No. 16/368,199, Pending.
(Continued)

*Primary Examiner* — Holly Rickman
*Assistant Examiner* — Linda N Chau
(74) *Attorney, Agent, or Firm* — Sughrue Mion, PLLC

(57) ABSTRACT

The magnetic tape includes: a non-magnetic support; and a magnetic layer including ferromagnetic powder, in which the ferromagnetic powder is ferromagnetic powder selected from the group consisting of hexagonal strontium ferrite powder and ε-iron oxide powder, and an amount of an edge weave of a tape edge on at least one side of the magnetic tape is 1.5 μm or less.

15 Claims, 1 Drawing Sheet

(56) References Cited

U.S. PATENT DOCUMENTS

| | | | |
|---|---|---|---|
| 9,311,946 B2 | 4/2016 | Tanaka et al. | |
| 10,410,665 B2 | 9/2019 | Ozawa et al. | |
| 10,811,048 B2 | 10/2020 | Ozawa et al. | |
| 2002/0086183 A1 | 7/2002 | Misawa | |
| 2002/0098280 A1* | 7/2002 | Otsuka | B08B 1/008 |
| | | | 427/129 |
| 2002/0164503 A1 | 11/2002 | Tani et al. | |
| 2003/0228489 A1 | 12/2003 | Doushita et al. | |
| 2004/0066725 A1 | 4/2004 | Usui | |
| 2004/0091746 A1 | 5/2004 | Nakamura et al. | |
| 2004/0151946 A1 | 8/2004 | Kato et al. | |
| 2004/0214046 A1 | 10/2004 | Ejiri et al. | |
| 2005/0053804 A1 | 3/2005 | Kato | |
| 2006/0066999 A1 | 3/2006 | Ejiri et al. | |
| 2006/0204812 A1 | 9/2006 | Moriyama et al. | |
| 2007/0262189 A1 | 11/2007 | Kubota | |
| 2009/0046396 A1 | 2/2009 | Nagata et al. | |
| 2009/0086368 A1 | 4/2009 | Kakuishi et al. | |
| 2011/0274947 A1 | 11/2011 | Ishiguro et al. | |
| 2012/0042899 A1 | 2/2012 | Boday et al. | |
| 2012/0045664 A1* | 2/2012 | Tanaka | G11B 5/70626 |
| | | | 428/840.2 |
| 2016/0171993 A1 | 6/2016 | Okubo | |
| 2017/0092315 A1 | 3/2017 | Ozawa et al. | |
| 2017/0186460 A1 | 6/2017 | Kasada et al. | |
| 2017/0221516 A1 | 8/2017 | Oyanagi et al. | |
| 2017/0372740 A1 | 12/2017 | Ozawa et al. | |
| 2018/0147626 A1 | 5/2018 | Shirata et al. | |
| 2018/0286442 A1 | 10/2018 | Ozawa et al. | |
| 2018/0286448 A1 | 10/2018 | Ozawa et al. | |
| 2018/0286451 A1 | 10/2018 | Ozawa et al. | |
| 2019/0027181 A1 | 1/2019 | Ozawa et al. | |
| 2019/0304488 A1 | 10/2019 | Ozawa et al. | |
| 2019/0304497 A1 | 10/2019 | Kurokawa et al. | |
| 2019/0304498 A1 | 10/2019 | Ozawa et al. | |
| 2019/0304499 A1 | 10/2019 | Kurokawa et al. | |
| 2020/0090694 A1 | 3/2020 | Sano et al. | |
| 2020/0251136 A1 | 8/2020 | Ozawa et al. | |
| 2020/0251138 A1 | 8/2020 | Ozawa et al. | |
| 2020/0279580 A1 | 9/2020 | Sano et al. | |
| 2020/0302962 A1 | 9/2020 | Sawayashiki et al. | |
| 2020/0342903 A1 | 10/2020 | Kasada | |
| 2020/0342906 A1 | 10/2020 | Kasada | |
| 2020/0365178 A1 | 11/2020 | Kasada | |
| 2020/0365179 A1 | 11/2020 | Kasada | |
| 2021/0012800 A1 | 1/2021 | Yamaga et al. | |
| 2021/0287702 A1 | 9/2021 | Ozawa et al. | |
| 2021/0375311 A1 | 12/2021 | Ozawa et al. | |

FOREIGN PATENT DOCUMENTS

| | | |
|---|---|---|
| JP | 2004-5795 A | 1/2004 |
| JP | 2004-55137 A | 2/2004 |
| JP | 2005-85305 A | 3/2005 |
| JP | 2005-276285 A | 10/2005 |
| JP | 2006-79691 A | 3/2006 |
| JP | 2009-87468 A | 4/2009 |
| JP | 2010-192065 A | 9/2010 |
| JP | 2010-264683 A | 11/2010 |
| JP | 2011-84036 A | 4/2011 |
| JP | 2011-134372 A | 7/2011 |
| JP | 2012-043495 A | 3/2012 |
| JP | 2016-110680 A | 6/2016 |
| JP | 2017-168178 A | 9/2017 |
| JP | 2018-92693 A | 6/2018 |
| JP | 2018-170051 A | 11/2018 |
| JP | 2018-170053 A | 11/2018 |
| JP | 2018-181396 A | 11/2018 |

OTHER PUBLICATIONS

U.S. Appl. No. 16/857,502, Pending.
U.S. Appl. No. 16/367,918, now U.S. Pat. No. 10,741,208.
U.S. Appl. No. 16/874,170, Pending.
U.S. Appl. No. 16/777,368, Pending.
U.S. Appl. No. 16/777,418, Pending.
U.S. Appl. No. 16/825,425, Pending.
Office Action dated Jul. 22, 2020 in U.S. Appl. No. 16/777,368.
Notice of Allowance dated Apr. 22, 2020 in U.S. Appl. No. 16/367,918.
Office Action dated Jul. 21, 2020 in U.S. Appl. No. 16/777,418.
Office Action dated Nov. 8, 2019 in U.S. Appl. No. 16/367,918.
Office Action dated Oct. 27, 2020 in U.S. Appl. No. 16/368,199.
Office Action dated Oct. 27, 2020 in U.S. Appl. No. 16/777,418.
Office Action dated Dec. 15, 2020 in U.S. Appl. No. 16/777,368.
Office Action dated Feb. 16, 2021 in U.S. Appl. No. 16/777,418.
Notice of Allowance dated Mar. 31, 2021 in U.S. Appl. No. 16/777,368.
Notice of Allowance dated Sep. 9, 2021 in U.S. Appl. No. 16/857,502.
Office Action dated Sep. 13, 2021 in U.S. Appl. No. 16/825,425.
U.S. Appl. No. 17/399,241, filed Aug. 11, 2021 (Ozawa).
Notice of Allowance dated Oct. 1, 2021 in U.S. Appl. No. 16/777,368.
Notice of Allowance dated Oct. 21, 2021 in U.S. Appl. No. 16/777,418.
Notice of Allowance dated Oct. 21, 2021 in U.S. Appl. No. 16/857,502.
Office Action dated Nov. 30, 2021 in U.S. Appl. No. 17/329,275.
Office Action dated Sep. 27, 2021 in U.S. Appl. No. 16/874,170.
Notice of Allowance dated May 21, 2021 in U.S. Appl. No. 16/777,368.
Notice of Allowance dated Jun. 2, 2021 in U.S. Appl. No. 16/777,418.
Office Action dated Apr. 19, 2021 in U.S. Appl. No. 16/857,502.
Office Action dated Apr. 8, 2021 in U.S. Appl. No. 16/368,199.
Office Action dated Jan. 3, 2022 in U.S. Appl. No. 17/399,241.
Notice of Allowance dated Feb. 11, 2022 in U.S. Appl. No. 16/777,368.
Notice of Allowance dated Feb. 24, 2022 in U.S. Appl. No. 16/857,502.
Notice of Allowance dated Feb. 4, 2022 in U.S. Appl. No. 16/825,425.
Notice of Allowance dated Feb. 8, 2022 in U.S. Appl. No. 16/777,418.
Notice of Allowance dated Feb. 9, 2022 in U.S. Appl. No. 16/368,199.
Notice of Allowance dated Mar. 14, 2022 in U.S. Appl. No. 17/329,275.
Office Action dated Jan. 11, 2022 in Japanese Application No. 2019-054337, corresponds to U.S. Appl. No. 16/825,425.
Office Action dated Jan. 11, 2022 in Japanese Application No. 2019-064370, corresponds to U.S. Appl. No. 16/831,158.
Notice of Allowance dated Feb. 3, 2022 in U.S. Appl. No. 16/874,170.
Notice of Allowance dated Apr. 18, 2022 in U.S. Appl. No. 17/399,241.

* cited by examiner

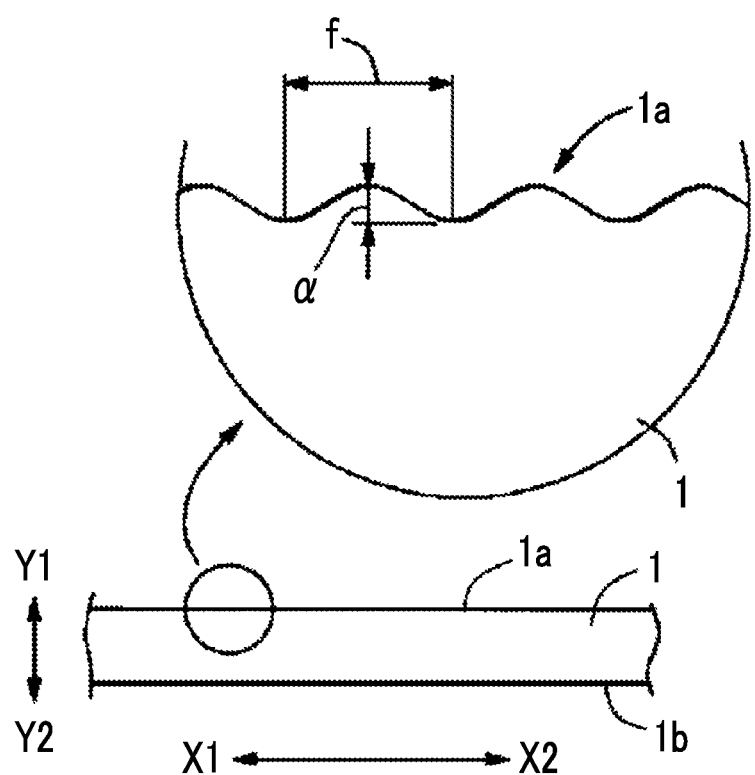

MAGNETIC TAPE, MAGNETIC TAPE CARTRIDGE, AND MAGNETIC RECORDING AND REPRODUCING APPARATUS

CROSS-REFERENCE TO RELATED APPLICATIONS

This application claims priority under 35 U.S.C 119 to Japanese Patent Application No. 2019-064370 filed on Mar. 28, 2019. The above application is hereby expressly incorporated by reference, in its entirety, into the present application.

BACKGROUND OF THE INVENTION

1. Field of the Invention

The present invention relates to a magnetic tape, a magnetic tape cartridge, and a magnetic recording and reproducing apparatus.

2. Description of the Related Art

There are a tape-shaped magnetic recording medium and a disk-shaped magnetic recording medium, and a tape-shaped magnetic recording medium, that is, a magnetic tape is mainly used for data storage applications (for example, see JP2002-269711A).

SUMMARY OF THE INVENTION

Data recorded on a recording medium such as a magnetic tape is called hot data, warm data, or cold data, in accordance with an access frequency (reproduction frequency). The access frequency decreases in the order of hot data, warm data, and cold data, and the cold data is usually stored as recorded on a recording medium for a long period of 10 years or longer (for example, several decades). A recording medium for recording and storing such cold data is called a recording medium for archive. It is desired for the recording medium for archive to exhibit excellent electromagnetic conversion characteristics, in a case of reproducing data recorded on the recording medium after long-term storage described above. Hereinafter "long-term storage" means storage of cold data for a storage period (a long period of 10 years or longer, for example, several decades), unless otherwise noted.

Along with a significant increase in the information content and digitization of various information items in recent years, the amount of cold data recorded and stored on the recording medium for archive is also increasing. Therefore, a demand for the recording medium for archive is increasing more and more.

Incidentally, a magnetic tape usually includes a non-magnetic support and a magnetic layer including ferromagnetic powder. In the examples of the above-mentioned JP2002-269711A, ferromagnetic iron-based metal powder is used as ferromagnetic powder (see a paragraph 0077 of the same publication). With respect to this, in recent years, hexagonal strontium ferrite powder and ε-iron oxide powder have attracted attention as ferromagnetic powder to be used for magnetic recording from a viewpoint of high density recording suitability and the like.

Accordingly, the present inventor has studied the application of a magnetic tape which includes a magnetic layer including a ferromagnetic powder selected from the group consisting of hexagonal strontium ferrite powder and ε-iron oxide powder to the recording medium for archive. However, in such a study, it was clear that electromagnetic conversion characteristics were greatly deteriorated after long-term storage (specifically, after an acceleration test corresponding to long-term storage), in a magnetic tape which includes a magnetic layer including ferromagnetic powder selected from the group consisting of hexagonal strontium ferrite powder and ε-iron oxide powder.

An object of an aspect of the present invention is to provide a magnetic tape suitable as a recording medium for archive, which includes a magnetic layer including ferromagnetic powder selected from the group consisting of hexagonal strontium ferrite powder and ε-iron oxide powder and in which deterioration of electromagnetic conversion characteristics after long-term storage is suppressed.

An aspect of the present invention relates to a magnetic tape comprising: a non-magnetic support; and a magnetic layer including ferromagnetic powder, in which the ferromagnetic powder is ferromagnetic powder selected from the group consisting of hexagonal strontium ferrite powder and ε-iron oxide powder, and an amount of an edge weave of a tape edge on at least one side of the magnetic tape is 1.5 µm or less.

In one aspect, a cycle of the edge weave may be in a range of 65.0 to 130.0 mm.

In one aspect, the amount of the edge weave may be 0.8 µm or more and 1.5 µm or less.

In one aspect, a difference ($S_{after}-S_{before}$) between a spacing $S_{after}$ measured on a surface of the magnetic layer by optical interferometry after methyl ethyl ketone cleaning and a spacing $S_{before}$ measured on the surface of the magnetic layer of the magnetic tape by optical interferometry before methyl ethyl ketone cleaning may be more than 0 nm and 15.0 nm or less.

In one aspect, the magnetic tape may further comprise a non-magnetic layer including non-magnetic powder between the non-magnetic support and the magnetic layer.

In one aspect, the magnetic tape may further comprise a back coating layer including non-magnetic powder on a surface side of the non-magnetic support opposite to a surface side provided with the magnetic layer.

Another aspect of the present invention relates to a magnetic tape cartridge comprising: the magnetic tape described above.

Another aspect of the present invention relates to a magnetic recording and reproducing apparatus comprising: the magnetic tape described above; and a magnetic head.

According to one aspect of the present invention, it is possible to provide a magnetic tape suitable as a recording medium for archive, which includes a magnetic layer including ferromagnetic powder selected from the group consisting of hexagonal strontium ferrite powder and ε-iron oxide powder and in which deterioration of electromagnetic conversion characteristics after long-term storage is small. In addition, according to one aspect of the present invention, it is possible to provide a magnetic tape cartridge and a magnetic recording and reproducing apparatus including the magnetic tape.

BRIEF DESCRIPTION OF THE DRAWINGS

FIG. 1 is an explanatory diagram of an edge weave.

DESCRIPTION OF THE PREFERRED EMBODIMENTS

Magnetic Tape

An aspect of the present invention relates to a magnetic tape including: a non-magnetic support; and a magnetic layer including ferromagnetic powder, in which the ferromagnetic powder is ferromagnetic powder selected from the group consisting of hexagonal strontium ferrite powder and ε-iron oxide powder, and an amount of an edge weave of a tape edge on at least one side of the magnetic tape is 1.5 μm or less.

Hereinafter, the amount of the edge weave and the cycle of the edge weave will be described below.

FIG. 1 is an explanatory diagram of an edge weave. FIG. 1 schematically shows an enlarged part of one tape edge 1a of tape edges 1a and 1b of a magnetic tape 1. In FIG. 1, an X1-X2 direction is a longitudinal direction of the magnetic tape and can also be referred to as a running direction. A Y1-Y2 direction is a width direction of the magnetic tape. The tape edge of the magnetic tape may have wavy unevenness called an edge weave (or edge wave) (unevenness formed by waving of an end surface of the magnetic tape in the width direction is wavy along the longitudinal direction). The amount of the edge weave (a in FIG. 1) of the edge weave is measured by an edge weave amount-measuring apparatus over the longitudinal direction of 50 m of a randomly selected region of the tape edge 1a or 1b. The cycle of the edge weave (f in FIG. 1) can be obtained by performing Fourier analysis on the measured amount of the edge weave. As an edge weave amount-measuring apparatus, a commercially available edge weave amount-measuring apparatus (for example, manufactured by KEYENCE Corporation) can be used. Various physical properties such as the amount of the edge weave in the present invention and this specification are values measured on a magnetic tape in which long-term storage corresponding to storage of cold data of a recording medium for archive or an acceleration test corresponding to such long-term storage is not performed.

The magnetic tape is usually used to be accommodated and circulated in a magnetic tape cartridge in a state of being wound around a reel. Recording of data on the magnetic tape is performed by setting the magnetic tape cartridge in a magnetic recording and reproducing apparatus (generally called as a "drive".), causing the magnetic tape to run in the magnetic tape cartridge, and causing a surface of the magnetic layer of the magnetic tape and a magnetic head to come into contact with each other to be slid on each other. The magnetic tape on which cold data is recorded is stored for a long period of time, for example, for 10 years or longer in such a state of being wound around the reel again and accommodated in the magnetic tape cartridge after the recording is performed. A storage period of the cold data is much longer than a period for which data is stored on a recording medium for normal data back-up. In a case where winding deviation occurs during winding on the reel before long-term storage, the magnetic tape is stored for a long time while a contact state between a surface of the magnetic tape on a magnetic layer side (that is, the magnetic layer surface) and a surface of the magnetic tape on a back surface side (for example, a surface of a back coating layer surface or a surface of a non-magnetic support) is not appropriate. The present inventor considers that any change on the magnetic layer surface due to this causes deterioration in electromagnetic conversion characteristics after long-term storage. Further, it is supposed that the reason why such deterioration in electromagnetic conversion characteristics after long-term storage is likely to occur in a magnetic tape which includes a magnetic layer including ferromagnetic powder selected from the group consisting of hexagonal strontium ferrite powder and ε-iron oxide powder is because the magnetic layer including ferromagnetic powder selected from the group consisting of hexagonal strontium ferrite powder and ε-iron oxide powder generally has a high anisotropy magnetic field Hk, and thus change of the magnetic layer surface greatly affects the electromagnetic conversion characteristics.

With respect to this, it is considered that setting the amount of an edge weave of a tape edge on at least one side of the magnetic tape to be 1.5 μm or less leads to suppression of winding deviation. This is supposed to be the reason why deterioration in electromagnetic conversion characteristics after long-term storage can be suppressed in the magnetic tape which includes a magnetic layer including ferromagnetic powder selected from the group consisting of hexagonal strontium ferrite powder and ε-iron oxide powder.

However, the above includes supposition of the present inventors, and the present invention is not limited to this supposition. Furthermore, the present invention is not limited to other suppositions described in this specification.

Hereinafter, the magnetic tape will be described more specifically.

Amount of Edge Weave

In the magnetic tape, the amount of an edge weave of a tape edge on at least one side of the magnetic tape is 1.5 pan or less. The amount of the edge weave is preferably 1.4 μm or less, more preferably 1.3 μm or less, and still more preferably 1.2 μm or less, from a viewpoint of further suppressing deterioration in electromagnetic conversion characteristics after long-term storage. Further, from a viewpoint of further suppressing deterioration in electromagnetic conversion characteristics after long-term storage, the amount of the edge weave is preferably 0.1 μm or more, more preferably 0.3 μm or more, still more preferably 0.5 μm or more, and still more preferably 0.8 μm or more. A tape edge whose edge weave amount is in the above range can be a tape edge on only one side of the magnetic tape, or can be tape edges on both sides thereof. For example, in the magnetic tape, a position of the magnetic tape in a width direction can be regulated by a flange inner surface of a guide roller provided in the magnetic recording and reproducing apparatus. In a case where the tape edge whose position in a width direction is regulated in this way is called a running reference-side tape edge, it is preferable that the amount of the edge weave in the running reference-side tape edge is in the above range. In addition, as the magnetic recording and reproducing apparatus, there is an apparatus configured to regulate a position of the magnetic tape in a width direction with respect to the tape edges on both sides of the magnetic tape, and in such an apparatus, the tape edges on both sides are referred to as a running reference side-tape edge.

The cycle of the edge weave having amount of the edge weave in the above range is preferably 130.0 mm or less, preferably 100.0 mm or less, and still more preferably 80.0 mm or less, from a viewpoint of further suppressing deterioration in electromagnetic conversion characteristics after long-term storage. From the same viewpoint, the cycle is preferably 65.0 mm or more, more preferably 70.0 mm or more, and still more preferably 80.0 mm or more. The cycle of the edge weave and the amount of the edge weave can be controlled by slit conditions during manufacturing the magnetic tape. For a control method thereof, descriptions disclosed in a paragraph 0030 of JP2002-269711A and examples of the same publication can be referred to.

Magnetic Layer

Ferromagnetic Powder

The magnetic layer of the magnetic tape includes ferromagnetic powder selected from the group consisting of hexagonal strontium ferrite powder and ε-iron oxide powder. It is preferable to use ferromagnetic powder having a small average particle size, from a viewpoint of improvement of recording density. In this respect, an average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from a viewpoint of magnetization stability, an average particle size of the ferromagnetic powder is preferably 5 nm or more, more preferably 8 nm or more, still more preferably 10 nm or more, still more preferably 15 nm or more, and still more preferably 20 nm or more.

In the magnetic layer of the magnetic tape, as ferromagnetic powder, only hexagonal strontium ferrite powder may be included, only ε-iron oxide powder may be included, or hexagonal strontium ferrite powder and ε-iron oxide powder may be included. Hereinafter, the hexagonal strontium ferrite powder and the ε-iron oxide powder will be further described below.

Hexagonal Strontium Ferrite Powder

In the present invention and this specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and this specification, hexagonal strontium ferrite powder means that the main divalent metal atom included in the powder is a strontium atom. In addition, hexagonal barium ferrite powder means that the main divalent metal atom included in this powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and this specification is selected from the group consisting of a scandium atom (Sc), an yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

An activation volume of hexagonal strontium ferrite powder is preferably in a range of 800 to 1500 $nm^3$. The finely granulated hexagonal strontium ferrite powder having an activation volume in the above range is suitable for producing a magnetic tape exhibiting excellent electromagnetic conversion characteristics. The activation volume of the hexagonal strontium ferrite powder is preferably 800 $nm^3$ or more, for example, 850 $nm^3$ or more. Further, from a viewpoint of further improving the electromagnetic conversion characteristics, the activation volume of the hexagonal strontium ferrite powder is more preferably 1400 $nm^3$ or less, still more preferably 1300 $nm^3$ or less, still more preferably 1200 $nm^3$ or less, and still more preferably 1100 $nm^3$ or less.

The "activation volume" is a unit of magnetization reversal and is an index indicating the magnetic size of a particle. An activation volume described in the present invention and this specification and an anisotropy constant Ku which will be described later are values obtained from the following relational expression between a coercivity Hc and an activation volume V, by performing measurement in an He measurement portion at a magnetic field sweep rate of 3 minutes and 30 minutes using a vibrating sample magnetometer (measurement temperature: 23° C.±1° C.). For a unit of the anisotropy constant Ku, 1 erg/cc=$1.0\times10^{-1}$ $J/m^3$.

$$Hc=2Ku/Ms\{1-[(kT/KuV)\ln(At/0.693)]^{1/2}\}$$

[In the above formula, Ku: anisotropy constant (unit: $J/m^3$), Ms: saturation magnetization (Unit: kA/m), k: Boltzmann constant, T: absolute temperature (unit: K), V: activation volume (unit: $cm^3$), A: spin precession frequency (unit: $s^{-1}$), t: magnetic field reversal time (unit: s)]

An index for reducing thermal fluctuation, in other words, improving thermal stability may include an anisotropy constant Ku. The hexagonal strontium ferrite powder preferably has Ku of $1.8\times10^5$ $J/m^3$ or more, and more preferably has Ku of $2.0\times10^5$ $J/m^3$ or more. Ku of the hexagonal strontium ferrite powder may be, for example, $2.5\times10^5$ $J/m^3$ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and this specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content >1.0. A rare earth atom content in hexagonal strontium ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content >1.0" means that in a particle of hexagonal strontium ferrite powder, rare earth atoms are unevenly distributed in a surface layer portion (that is, more than an inside). The surface layer portion in the present invention and this specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring hexagonal strontium ferrite powder contribute to suppression of a decrease in a reproducing output in repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to an improvement of running durability of the magnetic tape. It is supposed that this may be because uneven distribution of rare earth atoms on a surface of a particle configuring hexagonal strontium ferrite powder contributes to an improvement of interaction between the particle surface and an organic substance (for example, a binding agent and/or an additive) included in the magnetic layer, and, as a result, a strength of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and this specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and this specification. That is, unless otherwise noted, a certain component may be used alone or in combination of two or more. A content amount or content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. A "surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and the "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 µm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproducing output in a case of reproducing data recorded on the magnetic tape, it is desirable that mass magnetization as of the ferromagnetic powder included in the magnetic tape is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m²/kg or more, and may be 47 A·m²/kg or more. On the other hand, from a viewpoint of noise reduction, σs is preferably 80 A·m²/kg or less and more preferably 60 A·m²/kg or less. σs can be measured using a known measuring device, such as a vibrating sample magnetometer, capable of measuring magnetic properties. In the present invention and this specification, unless otherwise noted, the mass magnetization σs is a value measured at a magnetic field intensity of 15 kOe. 1 [kOe]=$10^6/4\pi$ [A/m].

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also called an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and this specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

In a case where the magnetic tape includes hexagonal strontium ferrite powder in the magnetic layer, the anisotropy magnetic field Hk of the magnetic layer is preferably 14 kOe or more, more preferably 16 kOe or more, and still more preferably, 18 kOe or more. In addition, the anisotropy magnetic field Hk of the magnetic layer is preferably 90 kOe or less, more preferably 80 kOe or less, and still more preferably 70 kOe or less.

The anisotropy magnetic field Hk in the present invention and this specification refers to a magnetic field in which magnetization is saturated in a case where a magnetic field is applied in a magnetization hard axis direction. The anisotropy magnetic field Hk can be measured using a known measuring device, such as a vibrating sample magnetometer, capable of measuring magnetic properties. In the magnetic layer including hexagonal strontium ferrite powder, the magnetization hard axis direction of the magnetic layer is an in-plane direction.

ε-Iron Oxide Powder

In the present invention and this specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. 5280 to 5284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic tape is not limited to the methods described here.

An activation volume of the ε-iron oxide powder is preferably in a range of 300 to 1500 nm$^3$. The finely granulated ε-iron oxide powder having an activation volume in the above range is suitable for producing a magnetic tape exhibiting excellent electromagnetic conversion characteristics. The activation volume of the ε-iron oxide powder is preferably 300 nm$^3$ or more, for example, 500 nm$^3$ or more. Further, from a viewpoint of further improving the electromagnetic conversion characteristics, the activation volume of the ε-iron oxide powder is more preferably 1400 nm$^3$ or less, still more preferably 1300 nm$^3$ or less, still more preferably 1200 nm$^3$ or less, and still more preferably 1100 nm$^3$ or less.

An index for reducing thermal fluctuation, in other words, improving thermal stability may include an anisotropy constant Ku. The ε-iron oxide powder preferably has Ku of $3.0 \times 10^4$ J/m$^3$ or more, and more preferably has Ku of $8.0 \times 10^4$ J/m$^3$ or more. Ku of the ε-iron oxide powder may be, for example, $3.0 \times 10^5$ J/m$^3$ or less. Here, it means that the higher Ku is, the higher thermal stability is, this is preferable, and thus, a value thereof is not limited to the values exemplified above.

From a viewpoint of increasing the reproducing output in a case of reproducing data recorded on the magnetic tape, it is desirable that mass magnetization σs of the ferromagnetic powder included in the magnetic tape is high. In this regard, in an aspect, σs of the ε-iron oxide powder may be 8 A·m$^2$/kg or more, and may be 12 A·m$^2$/kg or more. On the other hand, from a viewpoint of noise reduction, σs of the ε-iron oxide powder is preferably 40 A·m$^2$/kg or less and more preferably 35 A·m$^2$/kg or less.

In a case where the magnetic tape includes ε-iron oxide powder in the magnetic layer, the anisotropy magnetic field Hk of the magnetic layer is preferably 18 kOe or more, more preferably 30 kOe or more, and still more preferably, 38 kOe or more. In addition, the anisotropy magnetic field Hk of the magnetic layer is preferably 100 kOe or less, more preferably 90 kOe or less, and still more preferably 75 kOe or less. In the magnetic layer including ε-iron oxide powder, the magnetization hard axis direction of the magnetic layer is an in-plane direction.

In the present invention and this specification, unless otherwise noted, an average particle size of various types of powder such as ferromagnetic powder is a value measured by the following method using a transmission electron microscope.

The powder is imaged at a magnification ratio of 100,000 with a transmission electron microscope, and the image is printed on printing paper, is displayed on a display, or the like so that the total magnification ratio becomes 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and this specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe a powder in some cases.

As a method of taking sample powder from the magnetic tape in order to measure the particle size, a method disclosed in a paragraph of 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %. A high filling percentage of the ferromagnetic powder in the magnetic layer is preferable from a viewpoint of improvement of recording density.

Binding Agent and Curing Agent

The above magnetic tape may be a coating type magnetic tape, and may include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a nonmagnetic layer and/or a back coating layer which will be described later.

For the binding agent described above, descriptions disclosed in paragraphs 0028 to 0031 of JP2010-024113A can be referred to. An average molecular weight of the resin used as the binding agent can be, for example, 10,000 or more and 200,000 or less as a weight-average molecular weight. The weight-average molecular weight of the present invention and this specification is a value obtained by performing polystyrene conversion of a value measured by gel permeation chromatography (GPC) under the following measurement conditions. The weight-average molecular weight shown in examples of a binding agent which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

In an aspect, a binding agent containing an active hydrogen-containing group can be used as the binding agent. The "active hydrogen-containing group" in the present invention and this specification refers to a functional group that can form a cross-linked structure in a case where this group is subjected to curing reaction with a curable functional group and a hydrogen atom contained in this group is eliminated. Examples of the active hydrogen-containing group include a hydroxy group, an amino group (preferably a primary amino group or a secondary amino group), a mercapto group, a carboxy group, and the like. Among these, a hydroxy group, an amino group, and a mercapto group are preferable, and a hydroxy group is more preferable. In the binding agent containing the active hydrogen-containing group, an active hydrogen-containing group concentration is preferably in a range of 0.10 meq/g to 2.00 meq/g. "eq" is an equivalent and is a unit that cannot be converted into SI unit. Further, the active hydrogen-containing group concentration can be expressed by a unit "mgKOH/g". In an aspect, in a resin containing the active hydrogen-containing group, an active hydrogen-containing group concentration is preferably in a range of 1 to 20 mgKOH/g.

In an aspect, a binding agent containing an acidic group can be used as the binding agent. The "acidic group" in the present invention and this specification is used in a meaning including a form of a group capable of releasing $H^+$ in water or a solvent containing water (aqueous solvent) to be dissociated into an anion and a salt thereof. As a specific example of an acidic group, a form of each of a sulfonic acid group (—$SO_3H$), a sulfuric acid group (—$OSO_3H$), a carboxy group, a phosphoric acid group, and a salt thereof, can be used, for example. For example, a form of a salt of a sulfonic acid group (—$SO_3H$) means a group represented by —$SO_3M$, where M represents a group representing an atom (for example, an alkali metal atom or the like) which can be a cation in water or an aqueous solvent. The same applies to the form of each of salts of the various groups described above. As an example of a binding agent containing an acidic group, a resin containing at least one type of acidic group selected from the group consisting of a sulfonic acid group and a salt thereof (for example, a polyurethane resin, a vinyl chloride resin, or the like) can be used, for example. Here, the resin contained in the magnetic layer is not limited to these resins. In the binding agent containing an acidic group, an acidic group content may be, for example, in a range of 0.03 to 0.50 meq/g. Contents of various functional groups such as an acidic group included in a resin, can be obtained by a well-known method according to the kind of functional group. The binding agent can be used in a magnetic layer forming composition in an amount of, for example, 1.0 to 30.0 parts by mass with respect to 100.0 parts by mass of the ferromagnetic powder.

In addition, a curing agent can also be used together with the resin which can be used as the binding agent. As the curing agent, in an aspect, a thermosetting compound which is a compound in which a curing reaction (crosslinking reaction) is progressed due to heating can be used, and in another aspect, a photocurable compound in which a curing reaction (crosslinking reaction) is progressed due to light irradiation can be used. Curing reaction of a curable functional group of the curing agent proceeds during a process of manufacturing a magnetic tape, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the magnetic layer forming composition in an amount of, for example, 0 to 80.0 parts by mass, and preferably 50.0 to 80.0 parts by mass, from a viewpoint of improving a strength of the magnetic layer, with respect to 100.0 parts by mass of the binding agent.

Additive

The magnetic layer may include one or more kinds of additives, as necessary. As the additives, the curing agent described above is used as an example. In addition, examples of the additive which can be included in the magnetic layer include non-magnetic powder (for example, inorganic powder or carbon black), a lubricant, a dispersing agent, a dispersing assistant, an antibacterial agent, an antistatic agent, and an antioxidant. For example, for the lubricant, descriptions disclosed in paragraphs 0030 to 0033, 0035, and 0036 of JP2016-126817A can be referred to. The non-magnetic layer described later may include a lubricant. For the lubricant which may be included in the non-magnetic layer, descriptions disclosed in paragraphs 0030, 0031, 0034, 0035, and 0036 of JP2016-126817A can be referred to. For the dispersing agent, descriptions disclosed in paragraphs 0061 and 0071 of JP2012-133837A can be referred to. For the additive of the magnetic layer, descriptions disclosed in paragraphs 0035 to 0077 of JP2016-051493A can be referred to. A dispersing agent may be added to a non-magnetic layer forming composition. For the dispersing agent which can be included in the non-magnetic layer forming composition, a description disclosed in a paragraph 0061 of JP2012-133837A can be referred to. As the non-magnetic powder that can be included in the magnetic layer, non-magnetic powder which can function as an abrasive, or non-magnetic powder which can function as a protrusion forming agent which forms protrusions suitably protruded from the magnetic layer surface (for example, non-magnetic colloidal particles) is used. An average particle size of colloidal silica (silica colloidal particle) shown in the examples described later is a value obtained by a method disclosed in a paragraph 0015 of JP2011-048878A as a method for measuring an average particle diameter. As the additive, a commercially available product can be suitably selected or manufactured by a well-known method according to the desired properties, and any amount thereof can be used. Examples of the additive that can be used to improve the dispersibility of the abrasive in the magnetic layer containing the abrasive include a dispersing agent disclosed in paragraphs 0012 to 0022 of JP2013-131285A.

Spacing Difference ($S_{after}-S_{before}$) Before and After Methyl Ethyl Ketone Cleaning In an aspect, a difference ($S_{after}-S_{before}$) between a spacing $S_{after}$ measured by optical interferometry after methyl ethyl ketone cleaning and a spacing $S_{before}$ measured by optical interferometry before methyl ethyl ketone cleaning on a surface of the magnetic layer of the magnetic tape can be more than 0 nm and 15.0 nm or less.

In the present invention and this specification, "methyl ethyl ketone cleaning" means that a sample piece cut out from a magnetic tape is immersed in methyl ethyl ketone (200 g) at a liquid temperature of 20° C. to 25° C. and ultrasonically cleaned for 100 seconds (ultrasonic output: 40 kHz). A sample piece having a length of 5 cm is cut out from a magnetic tape to be cleaned and subjected to methyl ethyl ketone cleaning. A width of the magnetic tape and a width of the sample piece cut from the magnetic tape are usually ½ inches (1 inch is 0.0254 meters). For also magnetic tapes other than that having ½ inches width, a sample piece having a length of 5 cm may be cut out and subjected to methyl ethyl ketone cleaning. A measurement of a spacing after methyl ethyl ketone cleaning which will be described in detail below is performed after a sample piece after methyl ethyl ketone cleaning is left under an environment of a temperature of 23° C. and a relative humidity of 50% for 24 hours.

In the present invention and this specification, a spacing measured on the magnetic layer surface of the magnetic tape by optical interferometry is a value measured by the following method. The "magnetic layer surface (surface of the magnetic layer)" of the magnetic tape is the same meaning as a surface of the magnetic tape on a magnetic layer side.

In a state where the magnetic tape (specifically, the above sample piece. The same applies hereinafter) and a transparent plate member (for example, a glass plate or the like) are superposed such that the magnetic layer surface of the magnetic tape faces the transparent plate member, a pressing member is pressed at a pressure of 0.5 atm (1 atm is 101325 Pa (Pascal)) from a side of the magnetic tape opposite to a side of the magnetic layer. In this state, the magnetic layer surface of the magnetic tape is irradiated with light through the transparent plate member (irradiation region: 150,000 to 200,000 $\mu m^2$), and a spacing (distance) between the magnetic layer surface of the magnetic tape and a surface of the transparent plate member on the magnetic tape side is obtained based on an intensity (for example, a contrast of an interference fringe image) of interference light generated by an optical path difference between reflected light from the magnetic layer surface of the magnetic tape and reflected light from the surface of the transparent plate member on the magnetic tape side. Here, emitted light is not particularly limited. In a case where emitted light is light having a light emission wavelength over a relatively wide wavelength range, such as white light having light with a plurality of wavelengths, a member, such as an interference filter, which has a function of selectively cutting light with a specific wavelength or light out of a specific wavelength region is disposed between the transparent plate member and a light receiving section that receives reflected light, and light of some wavelengths or light in some wavelength regions in reflected light is selectively incident on the light receiving section. In a case where emitted light is light having a single emission peak (so-called monochromatic light), the member may not be used. As an example, a wavelength of light incident on the light receiving section can be in a range of 500 to 700 nm, for example. However, a wavelength of light incident on the light receiving section is not limited to the above range. Moreover, the transparent plate member may be a member having transparency which allows emitted light to pass therethrough to such an extent that the interference light can be obtained by irradiating the magnetic tape with light through this member.

An interference fringe image obtained by the above spacing measurement is divided into 300,000 points to obtain a spacing of each point (a distance between the magnetic layer surface of the magnetic tape and the surface of the transparent plate member on the magnetic tape side), and thus this is used as a histogram and a mode value in the histogram is used as a spacing. The difference ($S_{after}-S_{before}$)

is a value obtained by subtracting a mode value before methyl ethyl ketone cleaning from a mode value after methyl ethyl ketone cleaning at the above 300,000 points.

Two sample pieces are cut out from the same magnetic tape, and the spacing value $S_{before}$ is obtained without methyl ethyl ketone cleaning on one sample piece and the spacing value $S_{after}$ is obtained after subjecting the other sample piece to methyl ethyl ketone cleaning. Thereby, the difference ($S_{after}-S_{before}$) may be obtained. Alternatively, the difference ($S_{after}-S_{before}$) may be obtained by obtaining the spacing value after subjecting the sample piece for which the spacing value is obtained before methyl ethyl ketone cleaning to methyl ethyl ketone cleaning thereafter.

The above measurement can be performed using, for example, a commercially available tape spacing analyzer (tape spacing analyzer; TSA) such as tape spacing analyzer manufactured by Micro Physics. Spacing measurement in the examples was performed using a tape spacing analyzer manufactured by Micro Physics.

In general, the magnetic layer surface includes a portion (protrusion) that mainly contacts (so-called true contact) the magnetic head in a case where the magnetic layer surface and the magnetic head come into contact with each other to be slid on each other, and a portion (hereinafter, referred to as a "base portion") that is provided lower than the portion. It is considered that the spacing is a value serving as an index of a distance between the magnetic head and the base portion in a case where the magnetic layer surface and the magnetic head slide on each other. Here, in a case where any component is present on the magnetic layer surface, it is considered that the spacing becomes narrower as the amount of the component interposed between the base portion and the magnetic head increases. On the other hand, in a case where the component is removed by methyl ethyl ketone cleaning, the spacing is widened, and thus the value of spacing $S_{after}$ after methyl ethyl ketone cleaning becomes larger than the value of spacing $S_{before}$ before methyl ethyl ketone cleaning. Therefore, it is considered that the spacing difference ($S_{after}-S_{before}$) before and after methyl ethyl ketone cleaning can be used as an index of the amount of the component interposed between the base portion and the magnetic head.

With respect to the above point, the present inventors consider that the component removed by methyl ethyl ketone cleaning may cause a change in spacing between the magnetic layer surface and the magnetic head in a case where the magnetic layer surface and the magnetic head come into contact with each other to be slid on each other for reproducing data recorded on the magnetic layer. It is supposed that in a case where such a change in spacing can be suppressed, the deterioration in electromagnetic conversion characteristics after long-term storage can be further suppressed. For this reason, it is considered that decrease of the spacing difference ($S_{after}-S_{before}$) before and after methyl ethyl ketone cleaning, that is, reduction of the amount of the component contributes to further suppression of deterioration in electromagnetic conversion characteristics after long-term storage by suppressing the change in spacing. In this regard, according to the study by the present inventor, there was no correlation between a value of a spacing difference before and after cleaning using an organic solvent other than methyl ethyl ketone, for example, n-hexane, and the spacing difference ($S_{after}-S_{before}$) before and after methyl ethyl ketone cleaning. It is supposed that this is because the component cannot be removed or cannot be sufficiently removed with a solvent other than methyl ethyl ketone.

Details of the above component are not clear. As only supposition, the present inventor considers that the above component may be a component having larger molecular weight than that of an organic compound normally added as an additive to the magnetic layer. The present inventor supposes an aspect of this component as follows. In an aspect, the magnetic layer is formed by applying the magnetic layer forming composition containing the curing agent in addition to the ferromagnetic powder and the binding agent onto the non-magnetic support directly or via another layer, and performing a curing treatment. By the curing treatment here, the binding agent and the curing agent can be subjected to curing reaction (crosslinking reaction). However, it is considered that a binding agent not subjected to curing reaction with the curing agent or a binding agent having insufficient curing reaction with the curing agent is easily released from the magnetic layer and may also be present on the magnetic layer surface. It is supposed that presence of such a binding agent on the magnetic layer surface may also cause a change in spacing between the magnetic layer surface and the magnetic head in a case where the magnetic layer surface and the magnetic head come into contact with each other to be slid on each other.

However, the above is only supposition and does not limit the present invention.

From a viewpoint of further suppressing deterioration in electromagnetic conversion characteristics after long-term storage, the difference ($S_{after}-S_{before}$) is preferably more than 0 nm and 15.0 nm or less. From a viewpoint of still further suppressing deterioration in electromagnetic conversion characteristics after long-term storage, the difference ($S_{after}-S_{before}$) is preferably 14.0 nm or less, more preferably 13.0 nm or less, and still more preferably 12.0 nm or less. As will be described in detail later, the difference ($S_{after}-S_{before}$) can be controlled by a surface treatment of the magnetic layer in the manufacturing process of the magnetic tape. It is considered that in a case where the surface treatment of the magnetic layer is carried out so that the difference ($S_{after}-S_{before}$) before and after methyl ethyl ketone cleaning is 0 nm, a large amount of the additive (for example, a lubricant) of the magnetic layer is removed from the magnetic layer of the magnetic tape. Considering this point, the difference ($S_{after}-S_{before}$) is preferably more than 0 nm, more preferably 1.0 nm or more, still more preferably 2.0 nm or more, still more preferably 3.0 nm or more, and still more preferably 4.0 nm or more.

The magnetic layer described above can be provided directly on a surface of the non-magnetic support or indirectly through the non-magnetic layer.

Non-Magnetic Layer

Next, the non-magnetic layer will be described. The above magnetic tape may have a magnetic layer directly on the surface of the non-magnetic support, or may have a magnetic layer on the surface of the non-magnetic support via a non-magnetic layer including non-magnetic powder. Non-magnetic powder used for the non-magnetic layer may be an inorganic powder or an organic powder. In addition, carbon black and the like can be used. Examples of the inorganic powder include powder such as metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably in a range of 50 to 90 mass % and more preferably in a range of 60 to 90 mass %.

The non-magnetic layer can include a binding agent, and can also include one or more additives. In regards to other details of a binding agent or an additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

In the present invention and this specification, the non-magnetic layer also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

Non-Magnetic Support

As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. A corona discharge, a plasma treatment, an easy-bonding treatment, or a thermal treatment may be performed with respect to these supports in advance. For example, in a case where a protrusion is formed on the support surface by the non-magnetic powder contained in the support, the number of protrusions on the back coating layer surface can be reduced by suppressing influence of the protrusion of the non-magnetic support as the thickness of the back coating layer increases. In addition, in a case where the support is manufactured by a well-known method, presence state of the protrusion on the support surface can be adjusted according to the size and the content of the non-magnetic powder contained in the support.

Back Coating Layer

The magnetic tape may or may not include a back coating layer including non-magnetic powder and a binding agent on a surface side of the non-magnetic support opposite to a surface side provided with the magnetic layer. Preferably, the back coating layer contains one or both of carbon black and inorganic powder. In regards to the binding agent included in the back coating layer and various additives that can optionally be included therein, the well-known technique regarding the back coating layer can be applied, and the well-known technique regarding the treatment of the magnetic layer and/or the non-magnetic layer can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

Various Thicknesses

A thickness of the non-magnetic support is, for example, 3.0 to 80.0 µm, preferably in a range of 3.0 to 50.0 µm, and more preferably in a range of 3.0 to 10.0 µm.

A thickness of the magnetic layer can be optimized according to a saturation magnetization amount or a head gap length, and a band of a recording signal of the used magnetic head, and is, for example, 10 nm to 100 nm, and, from a viewpoint of high density recording, is preferably in a range of 20 to 90 nm and more preferably in a range of 30 to 70 nm. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 50 nm or more, preferably 70 nm or more, and more preferably 100 nm or more. On the other hand, the thickness of the non-magnetic layer is preferably 800 nm or less, and more preferably 500 nm or less.

A thickness of the back coating layer is preferably 0.9 µm or less, and more preferably in a range of 0.1 to 0.7 µm.

Thicknesses of each layer of the magnetic tape and the non-magnetic support can be obtained by a well-known film thickness measurement method. As an example, a cross section of the magnetic tape in a thickness direction is exposed by known means such as an ion beam or a microtome, and then a cross section observation is performed using a scanning electron microscope in the exposed cross section, for example. In the cross section observation, various thicknesses can be obtained as a thickness obtained at one portion of the cross section, or an arithmetic average of thicknesses obtained at a plurality of portions of two or more portions, for example, two portions which are randomly extracted. In addition, the thickness of each layer may be obtained as a designed thickness calculated according to manufacturing conditions.

Manufacturing Process

A composition for forming the magnetic layer, the non-magnetic layer, and the back coating layer usually contains a solvent together with the various components described above. As a solvent, various organic solvents generally used for manufacturing a coating type magnetic recording medium can be used. The amount of the solvent in each layer forming composition is not particularly limited, and can be the same as that of each layer forming composition of a normal coating type magnetic recording medium. A process of preparing each layer forming composition can generally include at least a kneading process, a dispersing process, and a mixing process provided before and after these processes as necessary. Each process may be divided into two or more stages. Various components used for the preparation of each layer forming composition may be added at an initial stage or in a middle stage of each process. In addition, each component may be separately added in two or more processes.

In order to prepare each layer forming composition, a well-known technique can be used. In the kneading process, preferably, a kneader having a strong kneading force such as an open kneader, a continuous kneader, a pressure kneader, or an extruder is used. Details of the kneading treatment are described in JP1989-106338A (JP-H01-106338A) and JP1989-079274A (JP-H01-079274A). Moreover, in order to disperse each layer forming composition, one or more kinds of dispersed beads selected from the group consisting of glass beads and other dispersed beads can be used as a dispersion medium. As such dispersed beads, zirconia beads, titania beads, and steel beads which are dispersed beads having a high specific gravity are suitable. These dispersed beads can be used by optimizing the particle diameter (bead diameter) and filling rate. As a dispersing device, a well-known dispersing device can be used. Each layer forming composition may be filtered by a well-known method before being subjected to a coating process. The filtering can be performed by using a filter, for example. As the filter used in the filtering, a filter having a pore diameter of 0.01 to 3 μm (for example, filter made of glass fiber or filter made of polypropylene) can be used, for example.

The magnetic layer can be formed, for example, by directly coating the magnetic layer forming composition onto the non-magnetic support or performing multilayer coating of the magnetic layer forming composition with the non-magnetic layer forming composition in order or at the same time. The back coating layer can be formed by coating the back coating layer forming composition to a side of the non-magnetic support opposite to a side provided with the magnetic layer (or to be provided with the magnetic layer). For details of coating for forming each layer, a description disclosed in a paragraph 0051 of JP2010-024113A can be referred to.

After the coating process, various treatments such as a drying treatment, an orientation treatment of the magnetic layer, a surface smoothing treatment (calendering treatment), and a slitting treatment can be performed. For the slitting treatment, descriptions disclosed in a paragraph 0030 of JP2002-269711A and examples of the same publication can be referred to. For various processes, for example, well-known techniques disclosed in paragraphs 0052 to 0057 of JP2010-024113A can be referred to. For example, a coating layer of the magnetic layer forming composition is preferably subjected to an orientation treatment while the coating layer is in a wet (undried) state. For the orientation treatment, the various well-known technologies such as descriptions disclosed in a paragraph 0067 of JP2010-231843A can be used. For example, a vertical orientation treatment can be performed by a well-known method such as a method using a polar opposing magnet. In an orientation zone, a drying speed of the coating layer can be controlled depending on a temperature and a flow rate of dry air and/or a transportation speed of the magnetic tape in the orientation zone. The coating layer may be preliminarily dried before the transportation to the orientation zone.

It is preferable to perform a heat treatment on the coating layer formed by coating the magnetic layer forming composition at any stage after the coating process of the magnetic layer forming composition. As an example, this heat treatment can be performed before and/or after the calendering treatment. The heat treatment can be performed, for example, by placing the support on which the coating layer of the magnetic layer forming composition is formed under a heated atmosphere. The heated atmosphere can be an atmosphere having an atmosphere temperature of 65° C. to 90° C., and is preferably an atmosphere having an atmosphere temperature of 65° C. to 75° C. This atmosphere can be, for example, an air atmosphere. The heat treatment under the heated atmosphere can be performed, for example, for 20 to 50 hours. In an aspect, this heat treatment can allow curing reaction of the curable functional group of the curing agent to proceed.

An aspect of the manufacturing method of the magnetic tape can include a manufacturing method including wiping the magnetic layer surface with a wiping material infiltrated with methyl ethyl ketone, preferably after the heat treatment (hereinafter, also referred to as a "methyl ethyl ketone wiping treatment"). By the methyl ethyl ketone wiping treatment, the value of the difference ($S_{after}-S_{before}$) described above can be reduced. It is considered that presence of a component that can be removed by the methyl ethyl ketone wiping treatment on the magnetic layer surface may also cause a change in spacing between the magnetic layer surface and the magnetic head in a case where the magnetic layer surface and the magnetic head come into contact with each other to be slid on each other.

The methyl ethyl ketone wiping treatment can be performed using a wiping material infiltrated with methyl ethyl ketone instead of the wiping material used in a dry wiping treatment, in accordance with the dry wiping treatment generally performed in the manufacturing process of the magnetic recording medium. For example, before or after slitting the magnetic tape into a width that fits in a magnetic tape cartridge, the magnetic tape is run between a feeding roller and a winding roller, and the wiping material (for example, clothes (for example, non-woven fabrics) or papers (for example, tissue papers)) infiltrated with methyl ethyl ketone is pressed against the magnetic layer surface of the running magnetic tape. Thereby, the methyl ethyl ketone wiping treatment on the magnetic layer surface can be performed. A running speed of the magnetic tape and a tension applied to the longitudinal direction of the magnetic layer surface (hereinafter, simply referred to as a "tension") in the above running can be the same as the processing condition generally used by the dry wiping treatment generally performed in the manufacturing process of the magnetic recording medium. For example, the running speed of the magnetic tape in the methyl ethyl ketone wiping treatment can be about 60 to 600 m/min, and the tension can be about 0.196 to 3.920 N (Newton). The methyl ethyl ketone wiping treatment can be performed at least once.

A polishing treatment and/or the dry wiping treatment (hereinafter, referred to as a "dry surface treatment") generally performed in the manufacturing process of the coating type magnetic recording medium can be performed on the magnetic layer surface one or more times. According to the dry surface treatment, for example, it is possible to remove foreign matters, such as chips generated by the slit, generated during the manufacturing process and adhering to the magnetic layer surface. In a case where the methyl ethyl ketone wiping treatment is performed, the dry surface treatment can be performed before and/or after the methyl ethyl ketone wiping treatment. Further, the back coating layer can be polished by pressing polishing means such as a polishing tape or a diamond wheel against the back coating layer surface. The number of protrusions on the back coating layer surface can also be controlled by the type of the polishing means used, the pressing pressure for pressing the polishing means against the back coating layer surface during polishing, and the like.

It is possible to form a servo pattern in the manufactured magnetic tape by a known method in order to enable tracking control of the magnetic head in the magnetic recording and reproducing apparatus, control of a running speed of the magnetic tape, and the like. The "formation of servo pattern" can also be referred to as "recording of servo signal". Hereinafter, the formation of the servo pattern will be described.

The servo pattern is usually formed along a longitudinal direction of the magnetic tape. Examples of control (servo control) types using a servo signal include a timing-based servo (TBS), an amplitude servo, and a frequency servo.

As shown in a European computer manufacturers association (ECMA)-319, a magnetic tape (generally called "LTO tape") conforming to a linear tape-open (LTO) standard employs a timing-based servo type. In this timing-based servo type, the servo pattern is formed by continuously disposing a plurality of pairs of non-parallel magnetic stripes (also referred to as "servo stripes") in a longitudinal direction of the magnetic tape. In the present invention and this specification, a "timing-based servo pattern" refers to a servo pattern that enables head tracking in a timing-based servo system servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading element elements.

As shown in ECMA-319, information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 µm or less, 1 to 10 µm, 10 µm or more, and the like.

Before the servo pattern is formed on the magnetic tape, the magnetic tape is usually subjected to a demagnetization (erasing) process. This erasing process can be performed by applying a uniform magnetic field to the magnetic tape using a direct current magnet or an alternating current magnet. The erasing process includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two methods. A first method is horizontal DC erasing of applying a magnetic field in one direction along a longitudinal direction of the magnetic tape. A second method is vertical DC erasing of applying a magnetic field in one direction along a thickness direction of the magnetic tape. The erasing process may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge and the magnetic tape cartridge is mounted in the magnetic recording and reproducing apparatus.

Magnetic Tape Cartridge

Another aspect of the present invention relates to a magnetic tape cartridge comprising: the magnetic tape described above.

The details of the magnetic tape included in the above magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing apparatus for recording and/or reproducing data on the magnetic tape, the magnetic tape is pulled out of the magnetic tape cartridge to be wound around the reel on the magnetic recording and reproducing apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge. The magnetic tape cartridge may be either a single reel type or a dual reel type magnetic tape cartridge. The above magnetic tape cartridge has only to include the magnetic tape according to one aspect of the present invention, and the well-known technology can be applied to the others.

Magnetic Recording and Reproducing Apparatus

Another aspect of the present invention relates to a magnetic recording and reproducing apparatus comprising: the magnetic tape described above; and a magnetic head.

In the present invention and this specification, the "magnetic recording and reproducing apparatus" means an apparatus capable of performing at least one of the recording of data on the magnetic tape or the reproducing of data recorded on the magnetic tape. Such an apparatus is generally called a drive. The magnetic recording and reproducing apparatus can be a sliding type magnetic recording and reproducing apparatus. The sliding type magnetic recording and reproducing apparatus is an apparatus in which the magnetic layer surface and the magnetic head come into contact with each other to be slid on each other, in a case of performing the recording of data on the magnetic tape and/or reproducing of the recorded data.

The magnetic head included in the magnetic recording and reproducing apparatus can be a recording head capable of performing the recording of data on the magnetic tape, or can be a reproducing head capable of performing the reproducing of data recorded on the magnetic tape. In addition, in an aspect, the magnetic recording and reproducing apparatus can include both of a recording head and a reproducing head as separate magnetic heads. In another aspect, the magnetic head included in the magnetic recording and reproducing apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing apparatus. For example, a magnetic head that records data and/or reproduces recorded data (hereinafter also referred to as "recording and reproducing head") can include two servo signal reading elements, and the two servo signal reading elements can read two adjacent servo bands simultaneously. One or a plurality of elements for data can be disposed between the two servo signal reading elements.

In the magnetic recording and reproducing apparatus, recording of data on the magnetic tape and/or reproducing of data recorded on the magnetic tape can be performed as the magnetic layer surface of the magnetic tape and the magnetic head come into contact with each other to be slid on each other. The magnetic recording and reproducing apparatus has only to include the magnetic tape according to one aspect of the present invention, and the well-known technology can be applied to the others.

For example, in a case of recording data and/or reproducing the recorded data, first, tracking using a servo signal is performed. That is, by causing the servo signal reading element to follow a predetermined servo track, the element for data is controlled to pass on the target data track. Displacement of the data track is performed by changing a servo track to be read by the servo signal reading element in a tape width direction.

The recording and reproducing head can also perform recording and/or reproducing with respect to other data bands. In this case, the servo signal reading element may be displaced to a predetermined servo band using the above described UDIM information, and tracking for the servo band may be started.

EXAMPLES

Hereinafter, the present invention will be described with reference to examples. Here, the present invention is not limited to aspects shown in the examples. "Parts" and "%" in the following description mean "parts by mass" and "mass %", unless otherwise noted. The following processes and evaluation were performed in an air having an atmosphere temperature of 23° C.±1° C., unless otherwise specified.

In Table 1 below, "SrFe1" and "SrFe2" represent hexagonal strontium ferrite powder, "ε-iron oxide" represents ε-iron oxide powder, and "BaFe" represents hexagonal barium ferrite powder having an average particle size of 21 nm.

An activation volume and an anisotropy constant Ku of various types of ferromagnetic powder described below are values obtained by the method described above using a vibrating sample magnetometer (manufactured by Toei Kogyo Co., Ltd.) for each ferromagnetic powder.

A mass magnetization σs is a value measured at a magnetic field intensity of 15 kOe using a vibrating sample magnetometer (manufactured by Toei Industry Co., Ltd.).

Further, an anisotropy magnetic field Hk of the magnetic layer described below is a value measured using a vibrating sample magnetometer of a TM-VSM5050-SMS type (manufactured by Tamagawa Co., Ltd.).

Method for manufacturing Ferromagnetic Powder

Manufacturing Method 1 of Hexagonal Strontium Ferrite Powder

"SrFe1" shown in Table 1 is hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the manufactured amorphous body was charged into an electric furnace, was heated to 635° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be cleaned by repeatedly performing decantation and was dried in a heating furnace at an internal temperature of the furnace of 110° C. for 6 hours to obtain hexagonal strontium ferrite powder.

The hexagonal strontium ferrite powder ("SrFe1" in Table 1) obtained above had an average particle size of 18 nm, an activation volume of 902 $nm^3$, an anisotropy constant Ku of $2.2 \times 10^5$ $J/m^3$, and a mass magnetization σs of 49 $A \cdot m^2/kg$.

12 mg of sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was checked that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was checked by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees Manufacturing Method 2 of Hexagonal Strontium Ferrite Powder "SrFe2" shown in Table 1 is hexagonal strontium ferrite powder manufactured by the following method.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed by a mixer to obtain a raw material mixture.

The obtained raw material mixture was dissolved in a platinum crucible at a melting temperature of 1380° C., and a hot water outlet provided at a bottom of the platinum crucible was heated while stirring a melt, and the melt was discharged in a rod shape at about 6 g/sec. Hot water was quenched and rolled by a water-cooled twin roller to manufacture an amorphous body.

280 g of the obtained amorphous body was charged into an electric furnace, was heated to 645° C. (crystallization temperature), and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be cleaned by repeatedly performing decantation and was dried in a heating furnace at an internal temperature of the furnace of 110° C. for 6 hours to obtain hexagonal strontium ferrite powder.

The obtained hexagonal strontium ferrite powder ("SrFe2" in Table 1) had an average particle size of 19 nm, an activation volume of 1102 $nm^3$, an anisotropy constant Ku of $2.0 \times 10^5$ $J/m^3$, and a mass magnetization σs of 50 $A \cdot m^2/kg$.

Method of Manufacturing ε-Iron Oxide Powder

"ε-iron oxide" shown in Table 1 is ε-iron oxide powder manufactured by the following method.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 1 g of citric acid in 9 g of pure water was added to the obtained solution, and the mixture was stirred for 1 hour. The powder sedimented after stirring was collected by centrifugal separation, was cleaned with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was added dropwise with stirring. After stirring for 1 hour while maintaining the temperature at 50° C., 14 mL of tetraethoxysilane (TEOS) was added dropwise and was stirred for 24 hours. Powder sedimented by adding 50 g of ammonium sulfate to the obtained reaction solution was collected by centrifugal separation, was cleaned with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was cleaned with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide ($\varepsilon$-$Ga_{0.28}Co_{0.05}Ti_{0.05}Fe_{1.62}O_3$). In addition, X-ray diffraction analysis is performed under the same condition as that described above for the manufacturing method 1 of hexagonal strontium ferrite powder, and from a peak of an X-ray diffraction pattern, it is checked that the obtained ferromagnetic powder does not include α-phase and γ-phase crystal structures, and has a single-phase and ε-phase crystal structure (ε-iron oxide type crystal structure).

The obtained ε-iron oxide powder ("ε-iron oxide" in Table 1) had an average particle size of 12 nm, an activation volume of 746 $nm^3$, an anisotropy constant Ku of $1.2 \times 10^5$ $J/m^3$, and a mass magnetization σs of 16 $A \cdot m^2/kg$.

Example 1

List of each layer forming composition is shown below.
List of Magnetic Layer Forming Composition
Magnetic Liquid Ferromagnetic powder (see Table 1): 100.0 parts
  Oleic acid: 2.0 parts
  Vinyl chloride copolymer (MR-104 manufactured by Kaneka Corporation): 10.0 parts
    (weight-average molecular weight: 55,000, active hydrogen-containing group (hydroxy group): 0.33 meq/g, $OSO_3K$ group (potassium salt of sulfuric acid group): 0.09 meq/g)
  $SO_3Na$ group-containing polyurethane resin: 4.0 parts
    (weight-average molecular weight: 70,000, active hydrogen-containing group (hydroxy group): 4 to 6 mgKOH/g, $SO_3Na$ group (sodium salt of sulfonic acid group): 0.07 meq/g)
  Polyalkyleneimine polymer (synthetic product obtained by the method disclosed in paragraphs 0115 to 0123 of JP2016-051493A): 6.0 parts
  Methyl ethyl ketone: 150.0 parts
  Cyclohexanone: 150.0 parts
Abrasive Liquid
  α-alumina (Brunauer-emmett-teller (BET) specific surface area: 19 $m^2/g$): 6.0 parts
  $SO_3Na$ group-containing polyurethane resin: 0.6 parts
    (weight-average molecular weight: 70,000, $SO_3Na$ group: 0.1 meq/g) 2,3-dihydroxynaphthalene: 0.6 parts
  Cyclohexanone: 23.0 parts
Protrusion Forming Agent Liquid
  Colloidal silica (average particle size: 120 nm): 2.0 parts
  Methyl ethyl ketone: 8.0 parts
Other Components
  Stearic acid: 3.0 parts
  Stearic acid amide: 0.3 parts
  Butyl stearate: 6.0 parts
  Methyl ethyl ketone: 110.0 parts
  Cyclohexanone: 110.0 parts
  Polyisocyanate (CORONATE (registered trademark) L manufactured by Tosoh Corporation): 3.0 parts
List of Non-Magnetic Layer Forming Composition
Non-magnetic inorganic powder
  α-iron oxide (average particle size: 10 nm, BET specific surface area: 75 $m^2/g$): 100.0 parts
  Carbon black (average particle size: 20 nm): 25.0 parts
  $SO_3Na$ group-containing polyurethane resin (weight-average molecular weight: 70,000, $SO_3Na$ group content: 0.2 meq/g): 18.0 parts
  Stearic acid: 1.0 part
  Cyclohexanone: 300.0 parts
  Methyl ethyl ketone: 300.0 parts
List of Back Coating Layer Forming Composition
Non-magnetic inorganic powder: ε-iron oxide (average particle size: 0.15 μm, BET specific surface area 52 $m^2/g$): 80.0 parts
  Carbon black (average particle size: 20 nm): 20.0 parts
  Vinyl chloride copolymer: 13.0 parts
  Sulfonate group-containing polyurethane resin: 6.0 parts
  Phenylphosphonic acid: 3.0 parts
  Cyclohexanone: 155.0 parts
  Methyl ethyl ketone: 155.0 parts
  Stearic acid: 3.0 parts
  Butyl stearate: 3.0 parts
  Polyisocyanate: 5.0 parts
  Cyclohexanone: 200.0 parts
Preparation of Magnetic Layer Forming Composition
A magnetic layer forming composition was prepared by the following method.

Various components of the magnetic liquid were dispersed (bead dispersion) for 24 hours using a batch type vertical sand mill to prepare a magnetic liquid. As dispersed beads, zirconia beads having a bead diameter of 0.5 mm were used.

Various components of the above abrasive liquid were mixed and then the mixture was put in a horizontal beads mill dispersing device together with zirconia beads having a bead diameter of 0.3 mm, and the bead volume/(abrasive liquid volume+bead volume) was adjusted to be 80%, and a beads mill dispersion process was performed for 120 minutes. The liquid after the process was taken out and subjected to ultrasonic dispersion filtration process using a flow type ultrasonic dispersion filtration device. Thereby, an abrasive liquid was prepared.

The prepared magnetic liquid and abrasive liquid, and the protrusion forming agent liquid and other components were put into a dissolver stirrer and stirred for 30 minutes at a circumferential speed of 10 m/sec, and subjected to processes of 3 passes at a flow rate of 7.5 kg/min by a flow type ultrasonic dispersing device, and then a magnetic layer forming composition was prepared by filtration through a filter having a pore diameter of 1 μm.

Preparation of Non-Magnetic Layer Forming Composition

Various components of the non-magnetic layer forming composition were dispersed using zirconia beads having a bead diameter of 0.1 mm by a batch type vertical sand mill for 24 hours, and then filtered using a filter having an average pore diameter of 0.5 μm. Thereby, a non-magnetic layer forming composition was prepared.

Preparation of Back Coating Layer Forming Composition

After kneading and diluting components excluding a lubricant (stearic acid and butyl stearate), polyisocyanate, and 200.0 parts of cyclohexanone among various components of the back coating layer forming composition by an open kneader, a dispersion process of 12 passes was performed by a horizontal beads mill dispersing device using zirconia beads having a bead diameter of 1 mm with a bead filling rate of 80 volume %, a rotor tip circumferential speed of 10 in/sec, and a retention time per pass of 2 minutes. Thereafter, the remaining components were added and stirred by a dissolver, and the obtained dispersion liquid was filtered using a filter having an average pore diameter of 1 μm. Thereby, a back coating layer forming composition was prepared.

Manufacturing of Magnetic Tape

The non-magnetic layer forming composition prepared in the above section was applied onto a surface of a biaxially stretched polyethylene naphthalate support having a thickness of 5.0 μm and was dried so that a thickness after drying becomes 400 nm, and thus a non-magnetic layer was formed. After that, the magnetic layer forming composition prepared in the above section was applied onto a surface of the non-magnetic layer so that a thickness after drying becomes 70 nm, and thus a coating layer was formed. While this coating layer of the magnetic layer forming composition is in a wet (undried) state, a vertical orientation treatment was performed in which a magnetic field of a magnetic field intensity of 0.3 T was applied in a direction perpendicular to a surface of the coating layer, and then the surface of the coating layer was dried. Thereafter, the back coating layer forming composition prepared in the above section was applied onto an opposite surface of the support so that the thickness after the drying becomes 0.4 μm, and then was dried. Thereby, a magnetic tape original roll was manufactured.

The manufactured magnetic tape original roll was subjected to a calendering treatment (surface smoothing treatment) by a calender formed of only metal rolls at a speed of 100 m/min, a linear pressure of 294 kN/m (1 kg/cm is 0.98 kN/m), and a surface temperature of a calendering roll of 100° C. Then, a heat treatment was performed in an environment of an atmosphere temperature shown in Table 1 for the time shown in Table 1. After the heat treatment, the magnetic tape original roll was slit by a cutter to obtain a magnetic tape having ½ inches width. The slitting was performed in a slitting device having a configuration shown in FIG. 4 of JP2002-269711A. The cycle of a suction sucking part of the slitting device was 13.5 mm, and a porous metal was embedded in the suction sucking part to form a mesh suction. Those shown in Table 1 were used as a drive belt and a coupling material of a power transmission device that transmits a power to a blade drive unit of the slitting device, and slitting was performed with a suction sucking pressure, and a winding angle and a slitting speed of the magnetic tape original roll with respect to a tension cut roller as values shown in Table 1.

While the magnetic tape after the slitting was run between a feeding roller and a winding roller (running speed of 120 m/min, tension: see Table 1), a blade polishing and a dry wiping treatment of the magnetic layer surface were performed in this order. Specifically, a sapphire blade and a dry wiping material (Toraysee manufactured by TORAY INDUSTRIES, INC. (registered trademark)) were disposed between the two rollers, and the sapphire blade was pressed against the magnetic layer surface of the magnetic tape running between the two rollers to perform the blade polishing, and then the dry wiping treatment on the magnetic layer surface was performed by the dry wiping material. Thereby, the blade polishing and the dry wiping treatment were each performed once on the magnetic layer surface.

Thus, a magnetic tape of Example 1 was obtained.

Examples 2 to 19 and Comparative Examples 1 to 6

A magnetic tape was manufactured in the same manner as in Example 1 except that various conditions were changed as shown in Table 1.

In Table 1, for the examples described as "Present" in a place of "Direct drive", slitting was performed by directly driving the blade drive unit by a motor without using the power transmission device using a belt. For the comparative examples described as "No mesh" in a place of "Suction sucking part", slitting was performed without embedding the porous metal in the suction sucking part of the slitting device.

In Examples 18 and 19, the magnetic tape original roll manufactured in the same manner as in Example 1 except that various conditions were changed as shown in Table 1 was subjected to a calendering treatment (surface smoothing treatment) by a calender formed of only metal rolls at a speed of 100 m/min, a linear pressure of 294 kN/m, and a surface temperature of a calendering roll of 100° C. Then, a heat treatment was performed in an environment of an atmosphere temperature shown in Table 1 for the time shown in Table 1. After the heat treatment, the magnetic tape original roll was slit by a cutter to obtain a magnetic tape having ½ inches width. While running this magnetic tape between a feeding roller and a winding roller (running speed of 120 m/min, tension: see Table 1), a blade polishing, a dry wiping treatment, and a methyl ethyl ketone wiping treatment of the magnetic layer surface were performed in this order. Specifically, a sapphire blade, a dry wiping material (Toraysee manufactured by TORAY INDUSTRIES, INC. (registered trademark)), and a wiping material (Toraysee manufactured by TORAY INDUSTRIES, INC. (registered trademark)) infiltrated with methyl ethyl ketone were disposed between the two rollers, and the sapphire blade was pressed against the magnetic layer surface of the magnetic tape running between the two rollers to perform the blade polishing, and then the dry wiping treatment on the magnetic layer surface was performed by the dry wiping material. After that, the methyl ethyl ketone wiping treatment on the magnetic layer surface was performed by the wiping material infiltrated with methyl ethyl ketone. Thereby, the blade polishing, the dry wiping treatment, and the methyl ethyl ketone wiping treatment were each performed once on the magnetic layer surface.

Evaluation of Magnetic Tape (1) Amount of Edge Weave and Cycle

An edge weave amount-measuring apparatus (manufactured by KEYENCE Corporation) was attached to a commercially available servo writer, and the amount of the edge weave was continuously measured over a tape length of 50 m at the tape edge on one side serving as the running reference side. Fourier analysis of the obtained amount of the edge weave was performed to obtain the cycle of the edge weave.

(2) Spacing Difference ($S_{after}-S_{before}$) Before and after Methyl Ethyl Ketone Cleaning Using a tape spacing analyzer (TSA; manufactured by Micro Physics), a spacing difference ($S_{after}-S_{before}$) before and after methyl ethyl ketone cleaning was obtained by the following method.

Two sample pieces having a length of 5 cm were cut from the magnetic tape, and one sample piece was not subjected to methyl ethyl ketone cleaning, and this a spacing ($S_{before}$) was obtained by the following method. The other sample piece was subjected to methyl ethyl ketone cleaning by the method described above, and then a spacing ($S_{after}$) was obtained by the following method.

In a state where a glass plate (a glass plate manufactured by Thorlabs, Inc. (model number: WG10530)) provided in TSA is disposed on the magnetic layer surface of the magnetic tape (specifically, the sample piece), using a urethane hemisphere provided in the TSA as a pressing member, the hemisphere was pressed against the back coating layer surface of the magnetic tape at a pressure of 0.5 atm. In this state, white light was emitted from a stroboscope provided in the TSA to a certain area (150,000 to 200,000 μm²) on the magnetic layer surface of the magnetic tape through a glass plate, and the obtained reflected light was received by a charge-coupled device (CCD) through an interference filter (a filter that selectively transmits light having a wavelength of 633 nm), and thus an interference fringe image generated by an unevenness of this area was obtained.

This image was divided into 300,000 points to obtain a distance (spacing) from the magnetic tape side surface of the glass plate to the magnetic layer surface of the magnetic tape of each point, and this was used as a histogram. Thus, a difference ($S_{after}-S_{before}$) was obtained by subtracting a mode value $S_{before}$ of the histogram obtained for the sample piece without methyl ethyl ketone cleaning from a mode value $S_{after}$ of the histogram obtained for the sample piece after methyl ethyl ketone cleaning.

(3) Spacing Difference ($S_{reference}-S_{before}$) Before and after n-Hexane Cleaning (Reference Value)

One sample piece having a length of 5 cm was further cut from the magnetic tape and was cleaned in the same manner as the above except that n-hexane was used instead of methyl ethyl ketone, and then a spacing after n-hexane cleaning was obtained in the same manner as described above. As a reference value, the difference ($S_{reference}-S_{before}$) between a spacing $S_{reference}$ obtained here and a spacing $S_{before}$ obtained for the uncleaned sample piece obtained in the above (2) was obtained.

(4) Change (Decrease in SNR) in Electromagnetic Conversion Characteristics (Signal-to-Noise-Ratio (SNR)) after Acceleration Test Corresponding to Long-Term Storage For each magnetic tape of the examples and the comparative examples, two tape samples were prepared in order to perform SNR measurement before and after an acceleration test corresponding to long-term storage. One tape sample was used for SNR measurement without performing an acceleration test corresponding to long-term storage. The other tape sample was used for SNR measurement after an acceleration test corresponding to long-term storage. An acceleration test corresponding to long-term storage was performed by storing a tape sample having a total length of 1000 m under an environment of a temperature of 60° C. and a relative humidity of 80% for 10 days in a state of being wound around a reel. This acceleration test corresponds to storage for 10 years or longer under an environment of a room temperature (about 20° C. to 25° C.).

The electromagnetic conversion characteristics (SNR) were measured by the following method using a ½ inches reel tester with a fixed head.

A head/tape relative speed was set to 5.5 m/sec, recording was performed using a metal-in-gap (MIG) head (a gap length of 0.15 μm, a track width of 1.0 μm), and a recording current was set to an optimum recording current for each tape sample. As a reproducing head, a giant-magnetoresistive (GMR) head having an element thickness of 15 nm, a shield interval of 0.1 μm, and a lead width of 0.5 μm was used. Recording was performed at a linear recording density of 350 kfci, and a reproducing signal was measured by a spectrum analyzer manufactured by Shibasoku Co., Ltd. For the signal, a portion where the signal was sufficiently stable after start of running of the tape sample was used. A ratio between an output value of a carrier signal and an integrated noise in an entire spectrum band was defined as SNR (Broadband-SNR; BB-SNR). The unit kfci is a unit of a linear recording density (cannot be converted into SI unit system).

The SNR was obtained as a relative value when an SNR before an acceleration test of Comparative Example 1 was used as a reference (0 dB).

The smaller the decrease amount of SNR after an acceleration test (SNR after an acceleration test–SNR before an acceleration test) measured by the above method is, the smaller the deterioration in electromagnetic conversion characteristics after long-term storage is, and it can be determined that the magnetic tape is suitable as a recording medium for archive.

The above results are shown in Table 1 (Table 1-1 to Table 1-3).

TABLE 1-1

|  |  | Example 1 | Example 2 | Example 3 | Example 4 |
|---|---|---|---|---|---|
| Magnetic layer | Ferromagnetic powder | SrFe1 | SrFe1 | SrFe1 | SrFe1 |
|  | Hk(Oe) | 25 | 25 | 25 | 25 |
| Slit conditions | Suction sucking part | Mesh | Mesh | Mesh | Mesh |
|  | Suction sucking pressure (×1000 Pa) | 13.3 | 13.3 | 13.3 | 13.3 |

TABLE 1-1-continued

|  |  |  |  |  |  |
|---|---|---|---|---|---|
|  | Winding angle | 188 degrees | 188 degrees | 188 degrees | 188 degrees |
|  | Drive belt | Flat belt | Flat belt | — | Flat belt |
|  | Coupling material | Rubber | Vibrationproof rubber | — | Rubber |
|  | Direct drive | — | — | Present | — |
|  | Slitting speed (m/min) | 200 | 200 | 200 | 300 |
| Edge weave | Cycle f (mm) | 65.0 | 65.0 | 65.0 | 98.0 |
|  | Amount of edge weave α (μm) | 1.5 | 1.3 | 0.8 | 1.5 |
| Heat treatment | Temperature | 60° C. | 60° C. | 60° C. | 60° C. |
|  | Time | 24 hours | 24 hours | 24 hours | 24 hours |
| Tension |  | 0.294 | 0.294 | 0.294 | 0.294 |
| Blade polishing and dry wiping treatment |  | Once | Once | Once | Once |
| Methyl ethyl ketone wiping treatment |  | Not performed | Not performed | Not performed | Not performed |
| (Reference value) Spacing difference ($S_{reference} - S_{before}$) before and after n-hexane cleaning (nm) |  | 2.0 | 2.0 | 2.0 | 2.0 |
| Spacing difference ($S_{after} - S_{before}$) before and after methyl ethyl ketone cleaning (nm) |  | 20.0 | 20.0 | 20.0 | 20.0 |
| Decrease amount of SNR (dB) |  | −0.9 | −0.8 | −0.7 | −0.8 |

|  |  | Example 5 | Example 6 | Example 7 | Example 8 |
|---|---|---|---|---|---|
| Magnetic layer | Ferromagnetic powder | SrFe1 | SrFe1 | SrFe1 | SrFe1 |
|  | Hk(Oe) | 25 | 25 | 25 | 25 |
| Slit conditions | Suction sucking part | Mesh | Mesh | Mesh | Mesh |
|  | Suction sucking pressure (×1000 Pa) | 13.3 | 13.3 | 13.3 | 13.3 |
|  | Winding angle | 188 degrees | 188 degrees | 188 degrees | 188 degrees |
|  | Drive belt | Flat belt | Flat belt | — | — |
|  | Coupling material | Vibrationproof rubber | Vibrationproof rubber | — | — |
|  | Direct drive | — | — | Present | Present |
|  | Slitting speed (m/min) | 300 | 400 | 300 | 400 |
| Edge weave | Cycle f (mm) | 98.0 | 130.0 | 98.0 | 130.0 |
|  | Amount of edge weave α (μm) | 1.3 | 1.3 | 0.8 | 0.8 |
| Heat treatment | Temperature | 60° C. | 60° C. | 60° C. | 60° C. |
|  | Time | 24 hours | 24 hours | 24 hours | 24 hours |
| Tension |  | 0.294 | 0.294 | 0.294 | 0.294 |
| Blade polishing and dry wiping treatment |  | Once | Once | Once | Once |
| Methyl ethyl ketone wiping treatment |  | Not performed | Not performed | Not performed | Not performed |
| (Reference value) Spacing difference ($S_{reference} - S_{before}$) before and after n-hexane cleaning (nm) |  | 2.0 | 2.0 | 2.0 | 2.0 |
| Spacing difference ($S_{after} - S_{before}$) before and after methyl ethyl ketone cleaning (nm) |  | 20.0 | 20.0 | 20.0 | 20.0 |
| Decrease amount of SNR (dB) |  | −0.8 | −0.9 | −0.7 | −0.8 |

TABLE 1-2

|  |  | Example 9 | Example 10 | Example 11 | Example 12 | Example 13 | Example 14 |
|---|---|---|---|---|---|---|---|
| Magnetic layer | Ferromagnetic powder | SrFe2 | ε-Iron oxide | ε-Iron oxide | ε-Iron oxide | ε-Iron oxide | ε-Iron oxide |
|  | Hk(Oe) | 19 | 30 | 30 | 30 | 30 | 30 |
| Slit conditions | Suction sucking part | Mesh | Mesh | Mesh | Mesh | Mesh | Mesh |
|  | Suction sucking pressure (×1000 Pa) | 13.3 | 13.3 | 13.3 | 13.3 | 13.3 | 13.3 |

TABLE 1-2-continued

|  |  |  |  |  |  |  |  |
|---|---|---|---|---|---|---|---|
|  | Winding angle | 188 degrees | 188 degrees | 188 degrees | 188 degrees | 188 degrees | 188 degrees |
|  | Drive belt | Flat belt | Flat belt | Flat belt | — | Flat belt | Flat belt |
|  | Coupling material | Rubber | Rubber | Vibrationproof rubber | — | Rubber | Vibrationproof rubber |
|  | Direct drive | — | — | — | Present | — | — |
|  | Slitting speed (m/min) | 200 | 200 | 200 | 200 | 300 | 300 |
| Edge weave | Cycle f (mm) | 65.0 | 65.0 | 65.0 | 65.0 | 98.0 | 98.0 |
|  | Amount of edge weave α (μm) | 1.5 | 1.5 | 1.3 | 0.8 | 1.5 | 1.3 |
| Heat treatment | Temperature | 60° C. | 60° C. | 60° C. | 60° C. | 60° C. | 60° C. |
|  | Time | 24 hours | 24 hours | 24 hours | 24 hours | 24 hours | 24 hours |
| Tension |  | 0.294 | 0.294 | 0.294 | 0.294 | 0.294 | 0.294 |
| Blade polishing and dry wiping treatment |  | Once | Once | Once | Once | Once | Once |
| Methyl ethyl ketone wiping treatment |  | Not performed | Not performed | Not performed | Not performed | Not performed | Not performed |
| (Reference value) Spacing difference ($S_{reference} - S_{before}$) before and after n-hexane cleaning (nm) |  | 2.0 | 2.0 | 2.0 | 2.0 | 2.0 | 2.0 |
| Spacing difference ($S_{after} - S_{before}$) before and after methyl ethyl ketone cleaning (nm) |  | 20.0 | 20.0 | 20.0 | 20.0 | 20.0 | 20.0 |
| Decrease amount of SNR (dB) |  | −0.8 | −0.9 | −0.9 | −0.8 | −0.8 | −0.8 |

|  |  | Example 15 | Example 16 | Example 17 | Example 18 | Example 19 |
|---|---|---|---|---|---|---|
| Magnetic layer | Ferromagnetic powder | ε-Iron oxide | ε-Iron oxide | ε-Iron oxide | SrFe1 | ε-Iron oxide |
|  | Hk(Oe) | 30 | 30 | 30 | 25 | 30 |
| Slit conditions | Suction sucking part | Mesh | Mesh | Mesh | Mesh | Mesh |
|  | Suction sucking pressure (×1000 Pa) | 133 | 13.3 | 13.3 | 13.3 | 133 |
|  | Winding angle | 188 degrees | 188 degrees | 188 degrees | 188 degrees | 188 degrees |
|  | Drive belt | — | Flat belt | — | Flat belt | Flat belt |
|  | Coupling material | Vibrationproof rubber | — | — | Rubber | Rubber |
|  | Direct drive | — | — | Present | Present | — | — |
|  | Slitting speed (m/min) | 400 | 300 | 400 | 200 | 200 |
| Edge weave | Cycle f (mm) | 130.0 | 98.0 | 130.0 | 65.0 | 65.0 |
|  | Amount of edge weave α (μm) | 1.3 | 0.8 | 0.8 | 1.5 | 1.5 |
| Heat treatment | Temperature | 60° C. | 60° C. | 60° C. | 70° C. | 70° C. |
|  | Time | 24 hours | 24 hours | 24 hours | 36 hours | 36 hours |
| Tension |  | 0.294 | 0.294 | 0.294 | 0.294 | 0.294 |
| Blade polishing and dry wiping treatment |  | Once | Once | Once | Once | Once |
| Methyl ethyl ketone wiping treatment |  | Not performed | Not performed | Not performed | Once | Once |
| (Reference value) Spacing difference ($S_{reference} - S_{before}$) before and after n-hexane cleaning (nm) |  | 2.0 | 2.0 | 2.0 | 2.0 | 2.0 |
| Spacing difference ($S_{after} - S_{before}$) before and after methyl ethyl ketone cleaning (nm) |  | 20.0 | 20.0 | 20.0 | 12.0 | 12.0 |
| Decrease amount of SNR (dB) |  | −0.9 | −0.7 | −0.7 | −0.2 | −0.3 |

TABLE 1-3

|  |  | Reference Example 1 | Reference Example 2 | Comparative Example 1 | Comparative Example 2 |
|---|---|---|---|---|---|
| Magnetic layer | Ferromagnetic powder | BaFe | BaFe | SrFe1 | SrFe1 |
|  | Hk(Oe) | 13 | 13 | 25 | 25 |
| Slit conditions | Suction sucking part | No mesh | No mesh | No mesh | No mesh |
|  | Suction sucking pressure (×1000 Pa) | 1.33 | 1.33 | 1.33 | 1.33 |
|  | Winding angle | 188 degrees | 188 degrees | 188 degrees | 188 degrees |
|  | Drive belt | Flat belt | Timing belt | Flat belt | Timing belt |

TABLE 1-3-continued

|  |  |  |  |  |  |
|---|---|---|---|---|---|
|  | Coupling material | Rubber | Metal | Rubber | Metal |
|  | Direct drive | — | — | — | — |
|  | Slitting speed (m/min) | 200 | 200 | 200 | 200 |
| Edge weave | Cycle f (mm) | 13.5 | 13.5 | 13.5 | 13.5 |
|  | Amount of edge weave α (μm) | 2.5 | 3.0 | 2.5 | 3.0 |
| Heat treatment | Temperature | 60° C. | 60° C. | 60° C. | 60° C. |
|  | Time | 24 hours | 24 hours | 24 hours | 24 hours |
| Tension |  | 0.294 | 0.294 | 0.294 | 0.294 |
| Blade polishing and dry wiping treatment |  | Once | Once | Once | Once |
| Methyl ethyl ketone wiping treatment |  | Not performed | Not performed | Not performed | Not performed |
| (Reference value) |  | 2.0 | 2.0 | 2.0 | 2.0 |
| Spacing difference ($S_{reference} - S_{before}$) before and after n-hexane cleaning (nm) |  |  |  |  |  |
| Spacing difference ($S_{after} - S_{before}$) before and after methyl ethyl ketone cleaning (nm) |  | 20.0 | 20.0 | 20.0 | 20.0 |
| Decrease amount of SNR (dB) |  | −1.0 | −1.0 | −3.2 | −3.5 |

|  |  | Comparative Example 3 | Comparative Example 4 | Comparative Example 5 | Comparative Example 6 |
|---|---|---|---|---|---|
| Magnetic layer | Ferromagnetic powder | SrFe2 | SrFe2 | ε-Iron oxide | ε-Iron oxide |
|  | Hk(Oe) | 19 | 19 | 30 | 30 |
| Slit conditions | Suction sucking part | No mesh | No mesh | No mesh | No mesh |
|  | Suction sucking pressure (×1000 Pa) | 1.33 | 1.33 | 1.33 | 1.33 |
|  | Winding angle | 188 degrees | 188 degrees | 188 degrees | 188 degrees |
|  | Drive belt | Flat belt | Timing belt | Flat belt | Timing belt |
|  | Coupling material | Rubber | Metal | Rubber | Metal |
|  | Direct drive | — | — | — | — |
|  | Slitting speed (m/min) | 200 | 200 | 200 | 200 |
| Edge weave | Cycle f (mm) | 13.5 | 13.5 | 13.5 | 13.5 |
|  | Amount of edge weave α (μm) | 2.5 | 3.0 | 2.5 | 3.0 |
| Heat treatment | Temperature | 60° C. | 60° C. | 60° C. | 60° C. |
|  | Time | 24 hours | 24 hours | 24 hours | 24 hours |
| Tension |  | 0.294 | 0.294 | 0.294 | 0.294 |
| Blade polishing and dry wiping treatment |  | Once | Once | Once | Once |
| Methyl ethyl ketone wiping treatment |  | Not performed | Not performed | Not performed | Not performed |
| (Reference value) |  | 2.0 | 2.0 | 2.0 | 2.0 |
| Spacing difference ($S_{reference} - S_{before}$) before and after n-hexane cleaning (nm) |  |  |  |  |  |
| Spacing difference ($S_{after} - S_{before}$) before and after methyl ethyl ketone cleaning (nm) |  | 20.0 | 20.0 | 20.0 | 20.0 |
| Decrease amount of SNR (dB) |  | −3.5 | −4.0 | −3.8 | −4.5 |

From the results shown in Table 1, it can be checked that in the magnetic tape of the example in which the magnetic layer includes ferromagnetic powder selected from the group consisting of hexagonal strontium ferrite powder and ε-iron oxide powder, a decrease in SNR after an acceleration test corresponding to long-term storage corresponding to data storage of a recording medium for archive is suppressed more than in the magnetic tape of the comparative example in which the magnetic layer includes ferromagnetic powder selected from the group consisting of hexagonal strontium ferrite powder and ε-iron oxide powder.

On the other hand, in the magnetic tapes of Reference Examples 1 and 2, which are magnetic tapes including hexagonal barium ferrite powder in the magnetic layer, the amount of the edge weave was the same as that of the comparative example, but the decrease amount of SNR was smaller than that of the comparative example. This is considered to indicate that in the magnetic tape which includes the magnetic layer including ferromagnetic powder selected from the group consisting of hexagonal strontium ferrite powder and ε-iron oxide powder, the amount of the edge weave greatly affects electromagnetic conversion characteristics after long-term storage.

As shown in Table 1, there is no correlation between the value of the spacing difference ($S_{reference} - S_{before}$) before and after n-hexane cleaning and the value of the spacing difference ($S_{after} - S_{before}$) before and after methyl ethyl ketone cleaning.

One aspect of the present invention is effective in a technical field of a magnetic tape for high-density recording.

What is claimed is:

1. A magnetic tape comprising:
   a non-magnetic support; and
   a magnetic layer including ferromagnetic powder,
   wherein the ferromagnetic powder is ferromagnetic powder selected from the group consisting of hexagonal strontium ferrite powder and ε-iron oxide powder,
   an amount of an edge weave of a tape edge on at least one side of the magnetic tape is 1.5 μm or less, and
   a difference $S_{after}-S_{before}$ between a spacing $S_{after}$ measured on a surface of the magnetic layer by optical interferometry after methyl ethyl ketone cleaning and a spacing $S_{before}$ measured on the surface of the magnetic layer by optical interferometry before methyl ethyl ketone cleaning is more than 0 nm and 15.0 nm or less.

2. The magnetic tape according to claim 1, wherein a cycle of the edge weave is in a range of 65.0 to 130.0 mm.

3. The magnetic tape according to claim 1,
   wherein the amount of the edge weave is 0.8 μm or more and 1.5 μm or less.

4. The magnetic tape according to claim 1, further comprising:
   a non-magnetic layer including non-magnetic powder between the non-magnetic support and the magnetic layer.

5. The magnetic tape according to claim 1, further comprising:
   a back coating layer including non-magnetic powder on a surface side of the non-magnetic support opposite to a surface side provided with the magnetic layer.

6. A magnetic tape cartridge comprising:
   the magnetic tape according to claim 1.

7. The magnetic tape cartridge according to claim 6,
   wherein a cycle of the edge weave is in a range of 65.0 to 130.0 mm.

8. The magnetic tape cartridge according to claim 6,
   wherein the amount of the edge weave is 0.8 μm or more and 1.5 μm or less.

9. The magnetic tape cartridge according to claim 6,
   wherein the magnetic tape further comprises a non-magnetic layer including non-magnetic powder between the non-magnetic support and the magnetic layer.

10. The magnetic tape cartridge according to claim 6,
    wherein the magnetic tape further comprises a back coating layer including non-magnetic powder on a surface side of the non-magnetic support opposite to a surface side provided with the magnetic layer.

11. A magnetic recording and reproducing apparatus comprising:
    the magnetic tape according to claim 1; and
    a magnetic head.

12. The magnetic recording and reproducing apparatus according to claim 11,
    wherein a cycle of the edge weave is in a range of 65.0 to 130.0 mm.

13. The magnetic recording and reproducing apparatus according to claim 11,
    wherein the amount of the edge weave is 0.8 μm or more and 1.5 μm or less.

14. The magnetic recording and reproducing apparatus according to claim 11,
    wherein the magnetic tape further comprises a non-magnetic layer including non-magnetic powder between the non-magnetic support and the magnetic layer.

15. The magnetic recording and reproducing apparatus according to claim 11,
    wherein the magnetic tape further comprises a back coating layer including non-magnetic powder on a surface side of the non-magnetic support opposite to a surface side provided with the magnetic layer.

* * * * *